United States Patent [19]

Torii et al.

[11] Patent Number: 5,111,019
[45] Date of Patent: May 5, 1992

[54] VARIABLE-PITCH SPOT WELDING GUN ASSEMBLY FOR A WELDING ROBOT

[75] Inventors: Nobutoshi Torii, Hachioji, Japan; Yasuo Naito; Kunio Ueda, both of Yamanashi, Japan

[73] Assignee: Fanuc Ltd., Yamanashi, Japan

[21] Appl. No.: 613,781

[22] PCT Filed: Mar. 19, 1990

[86] PCT No.: PCT/JP90/00366

§ 371 Date: Nov. 19, 1990

§ 102(e) Date: Nov. 19, 1990

[87] PCT Pub. No.: WO90/11160

PCT Pub. Date: Oct. 4, 1990

[30] Foreign Application Priority Data

Mar. 20, 1989 [JP] Japan ................... 1-65975

[51] Int. Cl.$^5$ ........................... B23K 11/10
[52] U.S. Cl. ....................... 219/87; 219/116
[58] Field of Search ............ 219/86.25, 86.33, 116; 901/42

[56] References Cited

U.S. PATENT DOCUMENTS

| | | | |
|---|---|---|---|
| 1,189,584 | 7/1916 | Kicklighter | 219/87 |
| 1,434,374 | 11/1922 | Lemon et al. | 219/87 |
| 4,291,214 | 9/1981 | Arthurs et al. | 219/116 |
| 4,496,821 | 1/1985 | Burgher et al. | 219/116 |
| 4,559,438 | 12/1985 | Nakadate et al. | 219/116 |

FOREIGN PATENT DOCUMENTS

| | | | |
|---|---|---|---|
| 61-87686 | 6/1986 | Japan. | |
| 61-42696 | 12/1986 | Japan. | |
| 62-158579 | 7/1987 | Japan | 219/87 |
| 63-21976 | 6/1988 | Japan. | |

OTHER PUBLICATIONS

"Articulated Type Industrial Robots for Various Application", Fanuc Robot S Series, RS-17, 10/1989.

*Primary Examiner*—Geoffrey S. Evans
*Attorney, Agent, or Firm*—Armstrong, Nikaido, Marmelstein, Kubovcik & Murray

[57] ABSTRACT

A variable pitch spot welding gun assembly for a welding robot has a fixed base (16) directly attached to the robot wrist (12) of an industrial welding robot, welding transformers (24, 26) fixed to the fixed base (16), a fixed spot welding gun (22) provided apart from the welding transformers (24, 26), a movable spot welding gun (20) provided apart from the welding transfomers (24, 26) and capable of being moved relative to the fixed spot welding gun (22), to adjust a pitch between the fixed spot welding gun (22) and the movable spot welding gun (20), and secondary conductors (44a to 44e) connecting the fixed and movable spot welding guns (22, 90) respectively to the welding transformers (24, 26).

5 Claims, 1 Drawing Sheet

VARIABLE-PITCH SPOT WELDING GUN ASSEMBLY FOR A WELDING ROBOT

TECHNICAL FIELD

The present invention relates to the construction of a spot welding gun assembly which is to be mounted on the robot wrist of a multi-articulated robot used for welding (hereinafter referred to as "welding robot") for carrying out spot-welding of a workpiece or a work. More particularly, the invention relates to a variable-pitch spot welding gun assembly for the welding robot, which assembly is provided with two spot welding guns, a sliding mechanism capable of varying the position of one of the two spot welding guns relative to the other, to thereby change a pitch therebetween, and welding transformers for supplying an electric current to the two spot welding guns, respectively, which are fixedly arranged at positions as near as possible to the robot wrist.

BACKGROUND ART

Welding robots are widely used in a mass-production line for the spot-welding of, for example, automobile bodies, as workpieces The appearance and performance of the robot unit of such a welding robot is described in, for example, a catalog published by Fanuc Ltd. (Head office: Yamanashi-ken Japan) "FANUC ROBOT S Series", p. 14, Oct, 1989. A spot welding robot incorporated into such a mass-production line produces a spot-welding energy by transforming an electric primary voltage into a secondary voltage through an electric transformer, and applying the secondary voltage across the electrodes of the spot welding gun. Since the transformer is very heavy, in general practice the electric transformer is installed outside the framework of the welding robot, i.e., a robot unit, and only the spot welding gun is mounted on the robot wrist in such a manner that the secondary voltage of the transformer is supplied to the spot welding gun through a secondary welding cable extended between the transformer and the robot unit.

Nevertheless, since the secondary welding cable is extended between the spot welding gun mounted on the robot wrist and the transformer installed apart from the robot unit, and because the welding cable used must be a heavy cable, due to a large current capacity thereof, the movement of the movable components of the robot unit such as the robot arm or the robot wrist, is obstructed by the welding cable if the robot body portion or the robot arm of the robot unit becomes entwined with the welding cable.

An improvement has been made, in an attempt to solve the problems attributable to the entwinement of the movable robot components with the welding cable, in which the transformer is disposed at a particular position on the robot unit, such as near the extremity of the robot wrist. Nevertheless, there is a need for an improvement of the production efficiency of the welding process in the mass-production line, through the curtailment of the processing time to the least possible extent by mounting two spot welding guns on a single welding robot to form a plurality of weld spots in a single spot-welding cycle.

When the two spot welding guns, each provided with an electric transformer are mounted on the robot wrist or a part in the vicinity of the robot wrist, however, the gravitational load on the robot wrist and other movable robot components is greatly increased, and accordingly, the robot unit becomes unable to fully exhibit its functions and the entire robot performance is restricted.

DISCLOSURE OF THE INVENTION

Accordingly, an object of the present invention is to provide a variable-pitch spot welding gun assembly for a welding robot, which enables a full utilization of a degree or degrees of freedom of motion of the welding robot and is provided with two spot welding guns supported so as to be movable toward and away from each other, to thereby curtail the time necessary for the spot welding process, and thus improve the efficiency of the spot welding process.

In the present invention, when two spot welding guns are mounted on the robot wrist of a welding robot, electric transformers for supplying electric power to the respective spot welding guns are separated from the spot welding guns and are attached to a portion of the welding robot near the center of motion of the robot wrist, the two spot welding guns are mounted on the front portion of the robot wrist so that the relative pitch between the two spot welding guns can be adjusted, and the transformers are connected to the two spot welding guns with electric secondary cables or secondary conductors having the least possible length, respectively.

Namely, in accordance with the present invention there is provided a variable-pitch spot welding gun assembly for a welding robot, which comprises a base directly fixed to a robot wrist of the robot;

an electrical transformer fixedly attached to the base for transforming an electric primary voltage into an electric secondary voltage necessary for spot-welding;

a fixed spot welding gun attached to the base and separated from said electrical transformer;

a movable spot welding gun movably mounted on said base and movable relative to the fixed spot welding gun along a predetermined axis, to thereby adjust a pitch therebetween; and an electric secondary flexible conductor electrically connecting the fixed and movable spot welding guns to the electrical transformer.

The variable-pitch spot welding gun assembly thus constructed does not obstruct the freedom of motion of the movable robot components, because the two spot welding guns, i.e., the fixed spot welding gun and the movable spot welding gun, are mounted on the robot wrist, the pitch between the two spot welding guns can be adjusted according to a specified distance between spot-welding lines on a workpiece, and the spot welding guns are connected to the electric transformers mounted on the robot wrist with welding cables having the least necessary length. Since the transformer for each spot welding gun is disposed near the axis of motion of the robot wrist, the moment of inertia of the robot wrist is reduced to the least possible extent, to avoid an excessive increase in the load on robot actions.

BRIEF DESCRIPTION OF THE DRAWINGS

The above and other objects, features and advantages of the present invention will become apparent from the ensuing description taken in conjunction with the accompanying drawings wherein.

BEST MODE OF CARRYING OUT THE INVENTION

Figure 1:
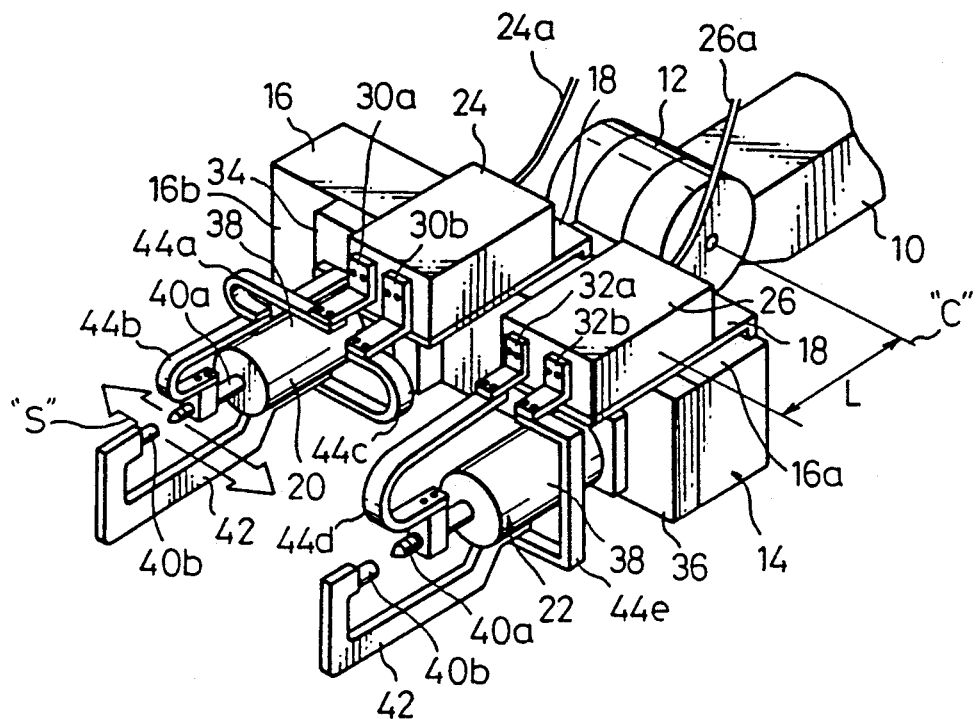
FIG. 1 is a perspective view of a variable-pitch spot welding gun assembly for a welding robot, in a preferred embodiment according to the present invention.

Referring to FIG. 1, a robot wrist 12 is attached to the extremity of a robot arm 10 of a welding robot, which is a generally known multi-articulated industrial robot controlled for operation according to a predetermined motion program by a robot controller, not shown. The robot wrist 12 is free to turn about an axis C and is provided at an extremity thereof with a mount, and a variable-pitch spot welding gun assembly 14 provided with two spot welding guns 20 and 22 is fixedly mounted on the mount of the robot wrist 12 by generally known attaching method using a suitable attaching means including bolts and positioning pins. The variable-pitch spot welding gun assembly 14 includes a base 16 having the shape of a box or the like and fixed to the mount of the robot wrist 12 by the suitable fixing means as mentioned above. Transformers 24 and 26 for supplying an electric power for welding to the respective spot welding guns 20 and 22 are fixedly attached to the upper surface 16a of the base 16 via base plates 18. Although the transformers 24 and 26 are comparatively heavy, the moment of inertia of the transformers 24 and 26 during the motion of the robot wrist 12 is limited to the least possible extent, because the transformers 24 and 26 are mounted on the upper surface 16a of the base 16 so that the length L ( FIG. 1 ) of the moment of inertia of the transformers 24 and 26, namely, the distance between the center of gravity of the transformers 24 and 26 and the axis C of rotation of the robot wrist, is limited to the least possible value. The transformers 24 and 26 are electrically connected to an electric power source, not shown, by electric primary cables 24a and 26a respectively, for welding to apply an electric primary voltage to the transformers 24 and 26. The primary cables 24a and 26a have a smaller diameter and weight than the secondary welding cables.

The output terminals 30a and 30b of the transformer 24, and the output terminals 32a and 32b of the transformer 26 are respectively connected to the two spot welding guns 20 and 22 by the secondary cables, which will be described later.

In the present embodiment, the spot welding gun 20 is a movable spot welding gun mounted on the base 16 to be laterally slid along the front surface 16b of the base 16, and the spot welding gun 22 is a fixed spot welding gun fixed to the front surface 16a of the base 16 with screw bolts or the like. The movable spot welding gun 20 is attached to a slider 34 having the shape of a plate, and the fixed spot welding gun 22 is stationarily held on a fixed base plate 36 secured to the front surface 16b of the base 16. The spot welding guns 20 and 22 have identical welding units, respectively, and each welding unit comprises a pair of electrodes 40a and 40b. The electrode 40a is a movable electrode capable of being advanced and retracted by a cylinder actuator 38, and the electrode 40b is a stationary electrode disposed opposite to the movable electrode 40a. A workpiece is held between the electrodes 40a and 40b for spot welding. Indicated at 42 is a rigid shunt holding the stationary electrode 40b and serving as a conductor for supplying electric welding current to the stationary electrode 40b. The electrodes 40a and 40b of the movable spot welding gun 20 are respectively connected to the output terminals 30a and 30b of the transformer 24 by three shunt members 44a 44b, and 44c, i.e., secondary conductors, each formed by superimposing electro-conductive and flexible plates, such as copper plates, and having a bend in the shape of the letter U. The stationary electrode 40b is connected to the output terminal 30b by the shunt member 44c. The electrode 40b is connected to the output terminal 30a by the shunt members 44a and 44b, which are joined perpendicularly to each other. Since the secondary conductor is formed of the U-shaped. electro-conductive flexible shunt members 44a to 44c, the sliding movement of the movable spot welding gun 20 and the axial movement of the movable electrode 40a caused by the cylinder actuator 38 can be smoothly and readily performed.

The movable electrode 40a of the fixed spot welding gun 22 is connected to the output terminal 32a of the fixed transformer 26 by a flexible and electroconductive shunt member 44d having the same construction as that of the shunt members 44a to 44c, so that the movable electrode 40a can be advanced and retracted with regard to the stationary electrode 40b, by the cylinder actuator 38. The stationary electrode 40b is connected to the output terminal 32b of the transformer 26 through the rigid shunt 42 by a shunt member 44e.

In the above-mentioned variable-pitch spot welding gun assembly, the movable spot welding gun 20 is individually slidable relative to the welding transformer 24, in directions indicated by a double-head arrow S, to adjust the pitch between the movable spot-welding gun 20 and the fixed spot welding gun 22 in compliance with a specific spot welding specification of a workpiece to be welded. The two spot welding guns cooperate to accomplish a highly efficient spot-welding work.

Figure 2:
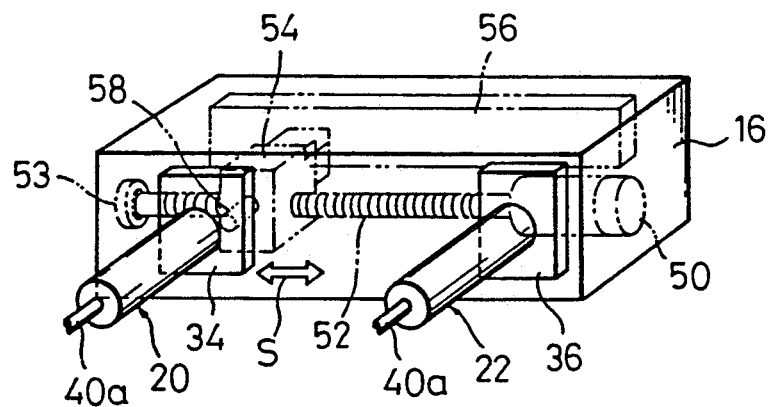
FIG. 2 is a schematic perspective view of a sliding mechanism for adjusting the distance between two spot welding guns.

A moving mechanism embodying the present invention and sliding the movable spot welding gun 20 will be described hereinafter with reference to FIG. 2.

As stated above, the box-shaped base 16 has the two welding transformers 24 and 26 mounted on its upper surface, and the movable spot welding gun 20 and the fixed spot welding gun 22 mounted on its front surface. A servomotor 50 and a ball-screw shaft 52 are provided inside the base 16. The ball-screw shaft 52 has one end operatively connected to the servomotor 50 and the other end supported in a bearing 53. The servomotor 50 drives the ball-screw shaft 52 for rotation. A ball-nut 54 is threadedly engaged with the ball-screw shaft 52 to construct a well-known feed mechanism. As the ball-screw shaft 52 is rotated, the ball-nut 54 moves along the axis of the ball-screw shaft 52. The ball-nut 54 stably moves along a straight guide 56 and is connected by a connecting rod 58 to the slider 34 slidable along a straight guide, not shown, disposed opposite to and in parallel to the straight guide 56, and thus the slider 34 is slid by the ball-nut 54. Accordingly, the movable spot welding gun 20 attached to the slider 34 is moved laterally together with the slider 34, in directions indicated by the double-head arrow S, to adjust the pitch between the movable spot welding gun 20 and the fixed spot welding gun 22 by controlling the angle of rotation of the motor 50.

As apparent from the foregoing description, since in the spot welding gun assembly 14 in accordance with the present invention the two spot welding guns 20 and 22 are supported so that the pitch between the spot welding guns 20 and 22 is adjustable, and the welding transformers 24 and 26 are mounted on the extremity of the robot wrist, the spot welding gun assembly 14 is capable of carrying out highly efficient spot welding work in an automobile mass-production line or the like, and of automatically changing the spot welding spacing according to the change of spot welding specifications for the work. Since the welding transformers are disposed near the center of motion of the robot wrist, the moment acting on the robot can be reduced to the least possible extent, and thus sufficiently free motions of the robot wrist can be secured. Further since the spot welding guns are connected to the transformers with short, flexible conductive shunts to the corresponding transformers, restrictions on the operation of the conventional welding robot attributable to the secondary cables are eliminated.

Furthermore, according to the present invention, the two spot welding guns, i.e., the movable spot gun welding gun and the fixed spot welding gun, integrated into the spot welding robot significantly improve the working efficiency and performance of the spot welding robot, and the arrangement of the electric transformers at the extremity of the robot wrist eliminates problems attributable to the obstruction of the free motion of the robot by the secondary cables. Note, the shunt member employed as a secondary cable in the foregoing embodiment is merely an example; the present invention may employ a flexible, stretchable cable structure, such as a structure consisting of a stretchable, resilient cable holder and a cable held on the cable holder, for the same function and utility.

We claim:

1. A variable-pitch spot welding gun assembly for a welding robot, comprising;
   a base means directly fixed to a robot wrist of the robot;
   an electrical transformer means, fixedly attached to said base means at a portion as near as possible to an axis of motion of said robot wrist, for transforming an electric primary voltage into an electric secondary voltage necessary to spot-welding, wherein said electric transformer means comprises first and second electric transformers fixedly disposed with a fixed space therebetween along a predetermined axis;
   a fixed spot welding gun attached to said base means and separated from said electrical transformer means, said first electric transformer being connected to said fixed spot welding gun;
   a movable spot welding gun movably mounted on said base means and movable relative to said fixed spot welding gun along said predetermined axis to adjust a pitch therebetween, said second electric transformer being connected to said movable spot welding gun; and
   an electric secondary flexible conductor means electrically connecting said fixed and movable spot welding guns to said electrical transformer means.

2. A variable-pitch spot welding gun assembly according to claim 1, wherein said base means is internally provided with a shifting means for moving said movable spot welding gun relative to said fixed spot welding gun to therein adjust the pitch between said fixed and movable spot welding guns.

3. A variable-pitch spot welding gun assembly according to claim 2, wherein said base means comprises a base body, and wherein said shifting means comprises a ball-screw shaft rotatably supported inside said base body, a ball-nut threadedly engaged with said ball-screw shaft, a slider connected to said bal-nut and having a mounting surface to which said movable spot welding gun is attached, and a motor for rotationally driving said ball-screw shaft.

4. A variable-pitch spot welding gun assembly according to claim 3, wherein said base body of said base means is provided with a mounting surface for holding said electric transformer means thereon.

5. A variable-pitch spot welding gun assembly according to claim 1, wherein said flexible secondary conductor means comprises a plurality of U-shaped electrical shunt members each formed by superimposing conductive plates capable of flexing at least in directions of movement of said movable spot welding gun.

* * * * *